United States Patent  [15] 3,666,765
Berijckere et al.  [45] May 30, 1972

[54] SYNTHESIS OF 2-PYRIDONES AND DERIVATIVES THEREOF

[72] Inventors: Antoon M. Berijckere, Uccle; Fernand G. F. Eloy, Genese, both of Belgium

[73] Assignee: Union Carbide Corporation, New York, N.Y.

[22] Filed: Oct. 27, 1969

[21] Appl. No.: 869,862

[52] U.S. Cl..................260/290 HL, 260/290 P, 260/297 Z, 260/294.8 D, 260/297 R, 260/294.8 F, 260/294.8 E, 260/294.9, 260/247.2 A, 260/293.69, 260/349, 260/347.3, 260/332.2 A, 260/453 P, 260/296 R, 260/346.1 R, 260/329 R, 260/86.1, 260/240 J, 260/240 D

[51] Int. Cl. .......................................................C07d 43/06
[58] Field of Search ........260/297 Z, 290 P, 290 HL, 294.8 F, 260/294.8 D, 294.9, 296 R, 297 R, 247.2 A, 294 AC, 247.5 R, 293 D, 240

[56] References Cited

UNITED STATES PATENTS 3,393,199  7/1968  Daum et al..........................260/297 Z

*Primary Examiner*—Henry R. Jiles
*Assistant Examiner*—S. D. Winters
*Attorney*—Paul A. Rose, Gerald O'Brien and William R. Moran

[57] ABSTRACT

2-Pyridones are conveniently synthesized from 2,4-pentadienoic acids by formation of the acid azide, decomposition of the azide into an isocyanate and the simultaneous cyclization of the isocyanate into the pyridone. The pyridones are readily converted into known pyridines.

17 Claims, No Drawings

SYNTHESIS OF 2-PYRIDONES AND DERIVATIVES THEREOF

This invention relates in general to the synthesis of 2-pyridones and derivatives thereof. In one aspect this invention is directed to a novel process for the preparation of 2-pyridones and derivatives thereof. In a further aspect, this invention is directed to a novel process for the preparation of pyridines.

Heretofore pyridones and pyridines have been prepared by a variety of methods reported in the literature. For example, pyridine compounds have been prepared by the Chichibabin Synthesis which involves the reaction of aldehydes and ketones with ammonia. Additionally, pyridine compounds can be prepared by the Hantzsch Synthesis, e.g., the condensation of acetoacetic ester with an aldehyde in the presence of ammonia.

The pyridones have been prepared by the decarboxylation of the hydroxypyridinecarboxylic acids. Moreover, it has been reported that N-alkyl-2-pyridones are formed from 2-chloro-1-alkylpyridinium halides with aqueous sodium hydroxide.

It has now been discovered that 2-pyridones and their pyridine derivatives can be conveniently prepared in high yields from readily available starting materials. The process is simple, efficient and provides a novel route to 2-pyridones which can easily be converted to the corresponding pyridines.

It is therefore an object of this invention to provide a novel synthesis for the preparation of 2-pyridones. Another object of this invention is to provide a novel process for the synthesis of 2-halo-pyridines. A further object of this invention is to provide a process for 3-substituted pyridines. A still further object of this invention is to provide a process for the preparation of 2-pyridones which can be obtained in relatively high yields. Another object is to provide a process which is simple and efficient. These and other objects will readily become apparent to those skilled in the art in light of the teachings herein set forth.

In its broad aspect, the present invention comprises a method for the synthesis of 2-pyridones of the formula:

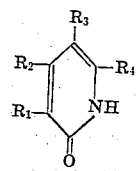

wherein $R_1$–$R_4$ each contain up to 18 carbon atoms and individually represent a member selected from the group consisting of hydrogen, hydrocarbyl, hydrocarbyloxyhydrocarbyl, furyl, thienyl and wherein $R_1$ can be either unsubstituted or contain one or more substituents selected from the group consisting of halo, alkyl, alkoxy, alkylthio, cyano, aryl, benzyl, haloalkyl, aryloxy, dialkylaminoalkyl, alkoxyalkyl, benzylthio, arylthio, alkenyl, alkynyl, alkylsulfonyl, arylsulfonyl, benzylsulfonyl, benzylthiomethyl, alkythioalkyl, dialkylamino, morpholino, arylthiomethyl, styryl, cycloalkyl, benzoyl, trihydrocarbylsilyl, benzyloxy, furyl, thenyl, dialkoxyalkyl, piperidinomethyl, aryloxyalkyl, benzoylvinyl, and admantyl.

The process comprises heating a 2,4-pentadienoic acid azide of the formula:

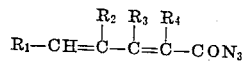

wherein $R_1$–$R_4$ are as above, at an elevated temperature for a period of time sufficient to produce the 2-pyridone.

The overall reaction involves the Curtius degradation of a 2,4-pentadienoic acid azide to a butadienyl isocyanate and cyclization into the pyridone in accordance with the following reaction:

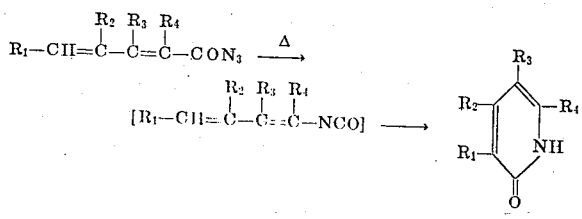

wherein $R_1$–$R_4$ are as defined above.

Preferred 2-pyridones which can be prepared by the process of this invention are those wherein $R_1$–$R_4$ contain up to 12 carbon atoms and individually represent a member selected from the group consisting of hydrogen, alkyl, aryl, alkaryl, aralkyl, alkoxy, alkoxyalkyl, alkoxyaryl, 2-furyl, 3-furyl, 2-thienyl, and 3-thienyl.

The starting materials employed in the process of this invention are the azides derived from 2,4-pentadienoic acids by known synthetic techniques. For example, the unsaturated acid can be reacted with thionyl chloride to form the corresponding acid chloride in accordance with the known reaction described by Fieser and Fieser (2nd edition) on page 183. The acid chloride is then reacted with sodium azide to produce the corresponding acid azide (Ref. Fieser and Fieser, 2nd Edition, pg. 299). If desired the azide can be produced in one step from the acid by using the method of G. Weinstock, J. Org. Chem. 26, 3511 (1961).

Illustrative acid azides which can be employed in the process of this invention include, among others, such compounds as:
2,4-pentadienoyl azide,
2,4-hexadienoyl azide,
2,4-heptadienoyl azide,
2,4-octadienoyl azide,
2,4-nonadienoyl azide,
2,4-decadienoyl azide,
5-phenyl-2,4-pentadienoyl azide,
5-naphthyl-2,4-pentadienoyl azide,
5-methoxy-2,4-pentadienoyl azide,
5-m-methoxyphenyl-2,4-pentadienoyl azide,
5-(2-thienyl)-2,4-pentadienoyl azide,
5-(2-furyl)-2,4-pentadienoyl azide,
2-p-methoxyphenyl-5-phenyl-2,4-pentadienoyl azide,
and the like.

As hereinafter indicated, the process of the invention comprises heating the acid azide at an elevated temperature for a period of time sufficient to produce the condensed pyridone. The exact temperature to which the azide must be heated in order to produce the condensed pyridone is dependent, in part, upon the exact nature of the reactant. In general, however, the reaction occurs at a temperature within the range of from about 200° C. to about 300° C., and preferably from about 200° C. to about 280° C. It is convenient to carry out the reaction by refluxing the azide in an inert, liquid reaction medium that boils within the temperature range indicated above. Such reaction mediums include diphenyl ether, the dibutyl diether of diethylene glycol, the acetate ester of the monobutyl ether of diethylene glycol, benzophenone, dimethyl phthalate, and the like. Diphenyl ether is the preferred reaction medium.

The exact reaction time varies to an extent, depending upon the exact nature of the azide, reaction medium, and the temperature. In most cases, the reaction will be completed in from about one-half to about four hours, and preferably from about one to about three hours.

As hereinbefore indicated the acid azide is converted by heat to the corresponding isocyanate which then undergoes cyclization to produce the pyridone.

Hence, the isocyanate can be produced in situ by the Curtius Rearrangement of the corresponding acid azide. This can be done by heating the azide at a relatively low temperature, for instance of from about 60° to 70° C., until evolution of nitrogen ceases, after which the reaction mixture is heated to a higher temperature to effect the ring closure reaction. However, a preferred way is to slowly introduce the acid azide into boiling reaction medium.

It is preferred to include a high boiling tertiary amine in the reaction mixture. Such amines include tri-(tert-butyl)amine, tripentylamine, trihexylamine, and the like. The tertiary amine can be used in varying amount, such as from about 5 mole percent to about 300 mole percent, and preferably from about 50 mole percent to about 150 mole percent, based on the moles of azide used.

The isocyanates formed from the azides and used in the process of the invention contain unsaturation which is capable of undergoing polymerization under certain conditions, as will be readily understood by chemists. Accordingly, it is desirable to carry out the process of the invention in the absence of free radical polymerization promotors, which includes oxygen. In many cases, the boiling reaction medium will provide a sufficiently inert atmosphere to avoid excessive loss of yield due to polymerization of the reactant and/or product. However, it may be desirable in some cases (such as when isocyanate contains a reactive substituent group such as a vinyl group) to add a free radical polymerization inhibitor to the reaction medium. Such inhibitors can be used in customary amounts, which are well known in the art.

The condensed pyridone product can be recovered by conventional procedures. For instance, the reaction medium can be removed by distillation under vacuum, the pyridone can be dissolved in diethyl ether, and then recrystallized from a convenient solvent. The examples below illustrate the solvents that can be used for the recrystallization. When a high-boiling tertiary amine is used in the reaction, it is most conveniently removed by vacuum distillation along with the reaction medium.

The pyridones of the invention are widely useful as reaction intermediates. For instance, they can be reacted with the acid chlorides of drying oil acids to form N-acyl derivatives which can be used in air-drying surface coating formulations in accordance with known techniques. The furo- and thieno-pyridones which have the 2,3-double bond unsubstituted can be copolymerized with vinyl type monomers to form useful copolymers. For instance, such furo- and thieno-pyridones can be first reacted with the acid chloride of a long chain alkanoic acid such as stearic acid to form the N-acyl derivative, which can then be copolymerized with acrylate monomers such as methyl methacrylate to form copolymers that have utility as viscosity index improvers for lubricating oils.

The invention also provides pyridine derivatives of the condensed pyridones described above. Such derivatives include those that are prepared by reacting a phosphorus halide with the pyridone to produce the halo-pyridine in accordance with the reactions:

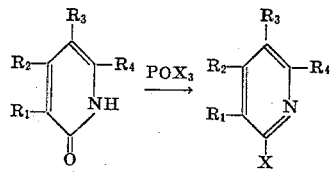

wherein $R_1$–$R_4$ are as above and X represents halogen, e.g., chloro or bromo. The reaction of a pyridone with phosphorus oxychloride or phosphorus oxybromide to produce a halo-pyridine is a known type of reaction, which is further illustrated by the examples which follow. The invention also provides substitution products of the halo-pyridines which are prepared by reacting the halo-pyridine with a primary or a secondary amine to produce an amino derivative, with thiourea to produce a mercapto derivative, with alkali metal alkoxide to produce an alkoxy derivative, the reaction of an alkali metal salt of an cyano compound that has at least one hydrogen attached to the carbon atom alpha to the cyano group to form an alpha-cyano derivative, with methyl iodine to form the N-methyl iodo derivative, the reaction with zinc and acetic acid to substitute a hydrogen atom for the halo group to form a pyridine, and the like. All of these reactions are known type reactions.

The halogen pyridines can also be converted to the corresponding pyridine by reduction in accordance with the following equation:

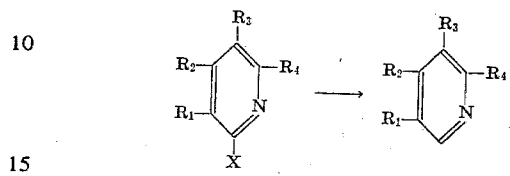

wherein X and $R_1$–$R_4$ are the same as indicated above. Reduction can be effected by one or more of several known methods, such as for example, by reducing with zinc metal in the presence of acetic acid. Other methods can also be emphasized.

As hereinafter indicated, the 2-pyridines prepared by the process of this invention are particularly useful as reaction intermediates for the preparation of known pyridines and 2-halogen-substituted pyridines.

The pyridines themselves are a class of compositions having known utility in a wide variety of fields. For example, the pyridines are useful as acceptors for hydrogen halides which are formed as byproducts in condensation reactions and as solvents for numerous organic and inorganic compounds.

The following examples are illustrative.

EXAMPLE 1

Preparation of 3-Methyl-2-Pyridone

One mole of triethylamine in 400 cc of acetone was introduced in a solution of 95.2 g (0.85 mole) of sorbic acid in 1,500 cc of the same solvent, the mixture being maintained at 0° C. A solution of 1.1 mole of ethyl chloroforminate in 400 cc of acetone was then slowly introduced in the cooled mixture. After 30 min. stirring, 1.3 moles of $NaN_3$ in 300 cc of water was added dropwise at 0° C. The mixture was stirred for an additional hour and poured on 4,000 ml $H_2O$. The azide 2,4-hexadienoyl azide, was then extracted with methylene chloride or benzene and the solution was dried on $NaSO_4$ or $P_2O_5$. This solution was used for the following reaction:

In a distillation vessel containing a boiling mixture of 1 liter of diphenyl ether and 185 g of tributylamine, the solution of crude azide was slowly introduced at such a rate that the low boiling solvent was continuously eliminated. The temperature of the mixture was maintained at 220°–240° C. during the introduction of the azide and one hour after. The mixture was then concentrated in vacuo and ether was added to complete the precipitation of the pyridone. The crude product was filtered, washed with ether and crystallized from benzene. M.p. 141° C. Yield of 60 percent of 3-methyl-2-pyridone was obtained.

EXAMPLES 2–6

In a manner similar to that set forth in Example 1, other pyridones were prepared from the appropriate starting materials. The products obtained and anlyztical data are set forth in Table I below:

TABLE I

| Example | Starting acid | Product | Percent yield | Melting point | Calculated C | Calculated H | Calculated N | Found C | Found H | Found N |
|---|---|---|---|---|---|---|---|---|---|---|
| 2 | 5-phenyl-2,4-pentadienoic acid | 3-phenyl-2-pyridone | 47 | 224–226 | 77.20 | 5.26 | 8.19 | 76.50 | 5.44 | 8.50 |
| 3 | 5-m. methoxyphenyl-2,4-pentadienoic | 3-m. methoxyphenyl-2-pyridone | 82 | 173 | 71.70 | 5.47 | 6.96 | 71.48 | 5.70 | 6.68 |
| 4 | 2-p. methoxyphenyl-5-phenyl-2,4-pentadienoic | 6-p. methoxyphenyl-3-phenyl-2-pyridone | 80 | 252 | 78.00 | 5.41 | 5.06 | 77.94 | 5.48 | 5.00 |
| 5 | 5-(2-thienyl)-2,4-pentadienoic | 3-(2-thienyl)-2-pyridone | 66 | 183 | 61.00 | 3.95 | 7.91 | 60.88 | 4.18 | 7.79 |
| 6 | 5-(2-furyl)-2,4-pentadienoic | 3-(2-furyl)-2-pyridone | 55 | 165 | 67.10 | 4.35 | 8.70 | 66.92 | 4.40 | 8.73 |

EXAMPLE 7

Preparation of 2-Chloro-3-Phenylpyridine from 3-Phenyl-2-Pyridone

A mixture of 17.1 g (0.1 mole) of 3-phenyl-2-pyridone and 25 g of $POCl_3$ was boiled for 4 hours and then evaporated. The residue was treated with ice and extracted with ether. After evaporation of the etheral solution, the remaining chloro derivative was isolated by distillation: B.P. 108° C/O. 1 mm Hg. Yield: 41 percent of 2-chloro-3-phenylpyridine.
Analysis:
calculated:  C 69.70   H 4.23   N 7.39
found:       C 68.97   H 4.25   N 7.46

This compound was reduced into 3-phenylpiperidine by catalytic reduction in acetic acid with $PtO_2$ at 50 psi and at room temperature. B.P. 80° C/1 mm Hg.
Analysis (picrate):
calculated:  C 52.30   H 4.62   N 14.35
found:       C 52.57   H 4.63   N 14.40

EXAMPLES 8-11

In a manner similar to that employed in Example 7 other pyridines were prepared from the corresponding pyridone using $POCl_3$ or $POBr_3$. The starting materials, pyridines and analytical data are set forth in Table II below:

TABLE II

| Example | Starting pyridone | Product | Boiling point | Calculated C | H | N | Found C | H | N |
|---|---|---|---|---|---|---|---|---|---|
| 8 | 3-phenyl-2-pyridone | 2-bromo-3-phenylpyridine | 104–105 | 56.40 | 3.42 | 5.99 | 55.80 | 3.57 | 5.87 |
| 9 | 3-m-methoxyphenyl-2-pyridone | 2-chloro-3-m-methoxyphenylpyridine | 126–128 | 65.60 | 4.65 | 6.38 | 65.06 | 4.74 | 6.39 |
| 10 | 3-(2-thienyl)-2-pyridone | 2-chloro-3-(2-thienyl)-pyridine | 180 | (See Example 13) | | | | | |
| 11 | 3-(2-furyl)-2-pyridone | 2-chloro-3-(2-furyl)-pyridine | 106–108 | (See Example 12) | | | | | |

EXAMPLE 12

2-Chloro-3-(2-furyl)pyridine was transformed into 2-chloro-3(5-nitro-2-furyl)pyridine as follows:

Six g of 2-chloro-3-(2-furyl)pyridine were dissolved in 10 ml of acetic anhydride. To this solution maintained below 5° C., 6 ml of concentrated nitric acid were introduced. The mixture was then poured out on ice and the precipitate of nitro derivative was filtered and crystallized from light petroleum ether. M.p. 121° C. Yield: 66 percent.
Analysis:
calculated:  C 48.05   H 2.23   N 12.45
found:       C 47.96   H 2.43   N 12.39.

EXAMPLE 13

2-chloro-(2-thienyl)pyridine was transformed into 3-(2-thienyl)-pyridine as follows:

A mixture of 6 g of 2-chloro-3-(2-thienyl)pyridine, 6 g of zinc and 150 ml of acetic acid was maintained to boiling for 3 hours and then evaporated. The residue was taken up in diluted NaOH and extracted with ethyl acetate. The organic layer was evaporated and the residue distilled at 95°–100°/1 mm Hg. Yield: 85 percent.
Analysis:
calculated:  C 67.00   H 4.35   N 8.70
found:       C 67.01   H 4.48   N 8.45

EXAMPLE 14

2-chloro-3(2-furyl)pyridine was transformed into 3-(2-furyl)pyridine in a manner similar to that employed in Example 13. The product had a boiling point of 78°–79° C. at 0.1 mm Hg. and the following analysis (picrate):
calculated:  C 48.15   H 2.67   N 14.95
found:       C 48.06   H 2.79   N 14.58

Although the invention has been illustrated by the preceeding examples, it is not to be construed as being limited to the materials employed therein but rather the invention encompasses the generic area as thereinbefore disclosed. Various modifications and embodiments thereof can be made without departing from the scope thereof.

What is claimed is:

1. A process for the preparation of 2-pyridones of the formula:

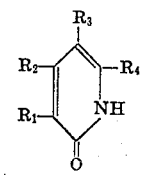

wherein $R_1$–$R_4$ each contain up to 18 carbon atoms and individually represent hydrogen, hydrocarbyl, hydrocarbyloxyhydrocarbyl, furyl, thienyl, and wherein $R_1$ can be either unsubstituted or contain a halo substituent, which process comprises heating a 2,4-pentadienoic acid azide of the formula:

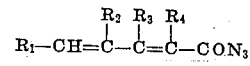

wherein $R_1$–$R_4$ are as above, at an elevated temperature for a period of time sufficient to produce said 2-pyridone and thereafter recovering said 2-pyridone.

2. The process of claim 1 wherein said temperature is from about 200° to about 300° C.

3. The process of claim 1 wherein said 2-pyridone is 3-methyl-2-pyridone.

4. The process of claim 1 wherein said 2-pyridone is 3-phenyl-2-pyridone.

5. The process of claim 1 wherein said 2-pyridone is 3-m-methoxyphenyl-2-pyridone.

6. The process of claim 1 wherein said 2-pyridone is 6-p-methoxyphenyl-3-phenyl-2-pyridone.

7. The process of claim 1 wherein said 2-pyridone is 3-(2-thienyl)-2-pyridone.

8. The process of claim 1 wherein said 2-pyridone is 3-(2-furyl)-2-pyridone.

9. A process for the preparation of 2-halogeno-pyridines of the formula:

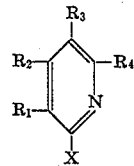

wherein $R_1$–$R_4$ each contain up to 18 carbon atoms and individually represent hydrogen, hydrocarbyl, hydrocarbyloxyhydrocarbyl, furyl, thienyl, and wherein $R_1$ can be either unsubstituted or contain a halo substituent, which process comprises the steps of:

1. heating a 2,4-pentadienoic acid azide of the formula:

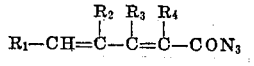

wherein $R_1$–$R_4$ are as above, at an elevated temperature for a period of time sufficient to produce the 2-pyridone of the formula:

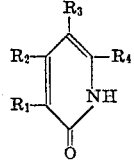

2. contacting said 2-pyridone with POX₃, wherein R₁–R₄ are as above, and X is halogen, and
3. recovering said 2-halogeno-pyridine.

10. The process of claim 9 wherein said 2-halogenopyridine is 2-chloro-3-phenylpyridine.

11. The process of claim 9 wherein said 2-halogenopyridine is 2-bromo-3-phenylpyridine.

12. The process of claim 9 wherein said 2-halogenopyridine is 2-chloro-3-m-methoxyphenylpyridine 13. The process of claim 9 wherein said 2-halogenopyridine is 2-chloro-3-(2-thienyl)pyridine.

14. The process of claim 9 wherein said 2-halogenopyridine is 2-chloro-3-(2-furyl)pyridine.

15. A process for the preparation of pyridines of the formula:

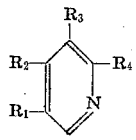

wherein R₁–R₄ each contain up to 18 carbon atoms and individually represent hydrogen, hydrocarbyl, hydrocarbyloxyhydrocarbyl, furyl, thienyl, and wherein R₁ can be either unsubstituted or contain a halo substituent, which process comprises the steps of:

1. heating a 2,4-pentadienoic acid azide of the formula:

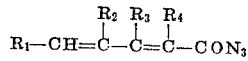

wherein R₁–R₄ are as above, at an elevated temperature for a period of time sufficient to produce the 2-pyridone of the formula:

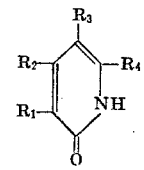

2. contacting said 2-pyridone with POX₃, wherein X is halogen and R₁–R₄ are, as above, to form the 2-halogenopyridine of the formula:

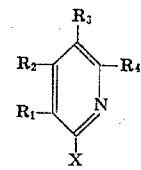

wherein X is halogen and R₁–R₄ are as above, and
3. reducing said 2-halogenopyridine.

16. The process of claim 15 wherein said pyridine is 3-(2-thienyl)pyridine.

17. The process of claim 15 wherein said pyridine is 3-(2-furyl)pyridine.

* * * * *